United States Patent
Nakanishi et al.

(10) Patent No.: US 7,457,273 B2
(45) Date of Patent: Nov. 25, 2008

(54) RADIO TERMINAL EQUIPMENT

(75) Inventors: Tomonori Nakanishi, Osaka (JP); Tameyuki Etani, Osaka (JP)

(73) Assignee: Fujitsu Limited, Kawasaki (JP)

( * ) Notice: Subject to any disclaimer, the term of this patent is extended or adjusted under 35 U.S.C. 154(b) by 560 days.

(21) Appl. No.: 11/025,000

(22) Filed: Dec. 29, 2004

(65) Prior Publication Data
US 2005/0111422 A1 May 26, 2005

Related U.S. Application Data

(63) Continuation of application No. PCT/JP02/12099, filed on Nov. 20, 2002.

(51) Int. Cl.
*H04Q 7/24* (2006.01)
(52) U.S. Cl. ............... 370/338; 370/328; 370/389; 370/252; 370/335; 370/447; 709/238; 709/241
(58) Field of Classification Search ............ 370/328, 370/389, 252, 345, 392, 331, 447, 461, 462, 370/312, 337, 335, 94.1; 709/238, 241
See application file for complete search history.

(56) References Cited

U.S. PATENT DOCUMENTS

| | | | | |
|---|---|---|---|---|
| 5,412,654 | A * | 5/1995 | Perkins ................. | 370/312 |
| 5,745,483 | A * | 4/1998 | Nakagawa et al. ........ | 370/335 |
| 5,987,011 | A * | 11/1999 | Toh ..................... | 370/331 |
| 6,307,843 | B1 * | 10/2001 | Okanoue ................ | 370/312 |
| 6,754,188 | B1 * | 6/2004 | Garahi et al. ............ | 370/328 |
| 6,904,032 | B2 * | 6/2005 | Cain .................... | 370/337 |
| 7,023,818 | B1 * | 4/2006 | Elliott .................. | 370/328 |
| 7,116,640 | B2 * | 10/2006 | Tasman et al. ........... | 370/252 |
| 7,159,035 | B2 * | 1/2007 | Garcia-Luna-Aceves et al. ................... | 709/241 |
| 7,266,085 | B2 * | 9/2007 | Stine ................... | 370/252 |
| 2003/0028668 | A1 * | 2/2003 | Garcia-Luna-Aceves et al. ................... | 709/238 |
| 2003/0063607 | A1 * | 4/2003 | Adachi et al. ........... | 370/389 |

FOREIGN PATENT DOCUMENTS

JP 11-289349 10/1999

OTHER PUBLICATIONS

Katsunori Aoyama, et al. Scalable Routing for Wireless Ad Hoc Networks. The Institute of Electronics, Information and Communication Engineers. 1999, pp. 7-12.

(Continued)

*Primary Examiner*—Edan Orgad
*Assistant Examiner*—Andrew C Lee
(74) *Attorney, Agent, or Firm*—Katten Muchin Rosenman LLP

(57) ABSTRACT

A radio terminal equipment includes a route supervision processing section for registering, for each destination address, an address of a radio-relay terminal equipment, which relays datagrams destined for the destination address, into a routing table in accordance with a predetermined dynamic routing protocol, a first transmission processing section for transmitting a datagram to a radio-relay terminal equipment corresponding to the destination address of the datagram in accordance with the routing table, a datagram supervision processing section for receiving the datagram transmitted by the radio-relay terminal equipment corresponding to the destination address of the datagram transmitted by the first transmission section to supervise whether or not the datagram has been relayed, and a second transmission processing section for transmitting, where the received datagram is to be relayed by the terminal equipment itself, the datagram to the radio terminal equipment corresponding to the destination address of the datagram in accordance with the routing table.

9 Claims, 15 Drawing Sheets

OTHER PUBLICATIONS

Masatoshi Nishizawa, et al. A Uni-Directional Link State Routing Method in Ad-hoc Networks. IPSJ Symposium Series, vol. 99, No. 7, pp. 273-278.

Koichi Takasugi, et al. Multicast Routing Protocol for Avoiding Congestion in Ad Hoe Wireless Network. 2000, pp. 991-998.

* cited by examiner

FIG. 6

| Data to be set | Length |
|---|---|
| (Substantially 0 to 12 bytes of IP header) | 12 Bytes |
| Origination source address | 4 Bytes |
| Destination address | 4 Bytes |
| Option ID | 1 Bytes |
| Identification ID (self terminal address) | 4 Bytes |
| Data area | |

FIG.7

| Dst | Src | NEXT | Active | Check | Num | IF |
|---|---|---|---|---|---|---|
| 192.168.0.10 | 192.168.0.20 | 192.168.0.1 | Yes | Yes | 0 | eth0 |
| 192.168.0.11 | 192.168.0.21 | 192.168.0.2 | No | Yes | 1 | eth0 |
| 192.168.0.10 | 192.168.0.21 | 192.168.0.1 | Yes | No | 0 | eth0 |

Dst: Destination address

Src: Originating source address

NEXT: Address of next hop terminal

Active: Whether the route is valid or invalid
(ON,valid;OFF,invalid)

Check: Whether the route is an object of check

Num: Counter: number of IP datagrams transmitted before confirmation of the transfer state IF: Utilized interface

FIG.8

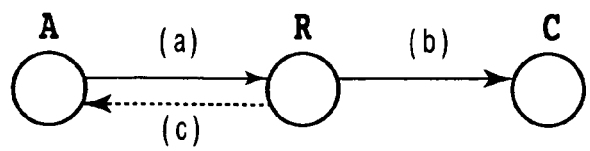

| Dst | Src | NEXT | Active | Check | Num | IF |
|-----|-----|------|--------|-------|-----|-----|
| C | A | R | — | Yes | 0 | Eth0 |

| Dst | Src | NEXT | Active | Check | Num | IF |
|-----|-----|------|--------|-------|-----|-----|
| C | A | R | No | Yes | 0 | Eth0 |

| Dst | Src | NEXT | Active | Check | Num | IF |
|-----|-----|------|--------|-------|-----|-----|
| C | A | R | Yes | No | 0 | Eth0 |

| Dst | Src | NEXT | Active | Check | Num | IF |
|-----|-----|------|--------|-------|-----|-----|
| C | A | R | No | No | 1 | Eth0 |

| Data to be set | Length |
|---|---|
| (Substantially 0 to 12 bytes of IP header) | 12Bytes |
| Originating source address (all zeros are set) | 4Bytes |
| Destination address (broadcast address) | 4Bytes |
| Option ID | 1Bytes |
| Identification ID (self terminal address) | 4Bytes |
| Before-change originating source address | 4Bytes |
| Before-change destinstion address | 4Bytes |
| Data area | |

RADIO TERMINAL EQUIPMENT

CROSS-REFERENCE TO RELATED APPLICATION

This is a continuation of International PCT Application No. PCT/JP02/12099, filed on Nov. 20, 2002, which was not published in English and which is herein incorporated by reference.

BACKGROUND OF THE INVENTION

1. Field of the Invention

This invention relates to a radio terminal equipment, and more particularly to communication in a radio ad hoc network. A packet is transmitted and received in accordance with a connectionless system to perform communication between a plurality of terminals each having a radio function.

2. Description of the Related Art

A LAN is constructed from a radio ad hoc network from the points of view that equipments can be constructed readily, that a terminal equipment can be moved for communication, and so forth. The radio ad hoc network performs communication between a plurality of terminals each having a radio function by transmitting and receiving a packet in accordance with a connectionless system. Particularly, the radio ad hoc network is likely to cause a disconnection of a radio route or the like by a movement of a terminal, an obstacle, or the like. A stabilized communication quality is required with regard to multimedia communication of sound, moving pictures, and so forth.

In the radio ad hoc network, a route to a radio terminal equipment (hereinafter referred to simply as terminal) of a transmission destination is set in accordance with a routing protocol, and a packet is delivered to the terminal of the transmission destination past a relay terminal or terminals on the route. Various protocols such as the AODV and the OSR are provided as a routing protocol for a radio ad hoc network. The routing protocol for a radio ad hoc network updates route information of the network after every fixed interval of time. Usually, a system is used wherein route information is communicated between terminals and, if a new route is found, then route information for a next terminal is updated. If the updating interval for route information decreases, then communication of route information increases as much and the network traffic increases. Therefore, the updating interval is usually designed so as to be several seconds to several tens seconds.

In a conventional radio ad hock network, when a terminal moves or when route information cannot be received over an updating interval because of increase of the traffic, it sometimes occurs that the route is cut and a fixed period of time is required until a new communication route is formed. In such an instance, packets while the communication route is cut are deleted.

For example, systems have been proposed as follows. In Japanese Patent Laid-open No. 2001-127797, even if the number of relay terminals to a destination terminal increases, the amount of information to be transmitted with a packet is reduced to decrease the time for re-establishing a route when the route is cut. In Japanese Patent Laid-open No. 2000-252992, the number of control packets for re-establishment of a route is reduced to prevent reduction of the data traffic. However, the systems mentioned decrease control packets to be transmitted and received for route alteration or for control of such alteration, and have a problem in that packets relating to the route are deleted before a route is re-established.

Further, in Japanese patent Laid-open No. 11-289349, if a destination terminal moves until the route is cut and packets do not reach the destination terminal any more, then packets are retained once into a different terminal. After the destination terminal appears within a radio communicatable range of a relay terminal, the destination terminal receives the missing packets retained by the retaining terminal from the relay terminal. However, according to this system, time is required after an originating terminal transmits a packet until the packet reaches a destination terminal through the retaining terminal, and the system is not effective with multi-medial communication for which the real time property of sound, moving pictures, and so forth is required.

In a radio ad hock network, when a route relating to a terminal intermediately of a route disappears, some time is required before a new route is established. Packets relating to the route, which are included in the time period, are lost. While the real time property must be assured in multimedia communication, the packets lost within the time cannot be assured. Therefore, this makes a cause of deteriorating the quality of the service. Although systems for reduction of the time for re-establishment of a route and for reduction of control packets have conventionally been proposed, the systems do not disclose a system for preventing the loss of packets in multimedia communication.

SUMMARY OF THE INVENTION

It is an object of the present invention to provide a radio terminal that can achieve a high quality service even where a communication route is temporarily cut by some reason in a radio ad hoc network.

According to an aspect of the present invention, a radio terminal equipment includes a route supervision processing section for registering, for each destination address, an address of a radio-relay terminal equipment, which relays datagrams destined for the destination address, into a routing table in accordance with a predetermined dynamic routing protocol, a first transmission processing section for transmitting a datagram to a radio-relay terminal equipment corresponding to the destination address of the datagram in accordance with the routing table, a datagram supervision processing section for receiving the datagram transmitted by the radio-relay terminal equipment corresponding to the destination address of the datagram transmitted by the first transmission section to supervise whether or not the datagram has been relayed, and a second transmission processing section for transmitting, where the received datagram is to be relayed by the terminal equipment itself, the datagram to the radio terminal equipment corresponding to the destination address of the datagram in accordance with the routing table.

Preferably, when it is discriminated that the datagram has not been relayed, the first transmission processing section stores a datagram whose destination address is same as that of the datagram into a storage section and refers to the routing table. When the address of the radio-relay terminal equipment with regard to the destination address of the datagram is updated, datagrams stored in the storage section are transmitted in order of storage times thereof.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIG. 6 is a view illustrating an example of a configuration of an IP header;

FIG. 7 is a view illustrating a configuration of an IP datagram information table in FIG. 5;

FIG. 8 is a view illustrating transfer supervision;

DETAILED DESCRIPTION OF THE PREFERRED EMBODIMENTS

Before the best mode for carrying out the invention is described, a principle of the present invention is described.

Figure 1:
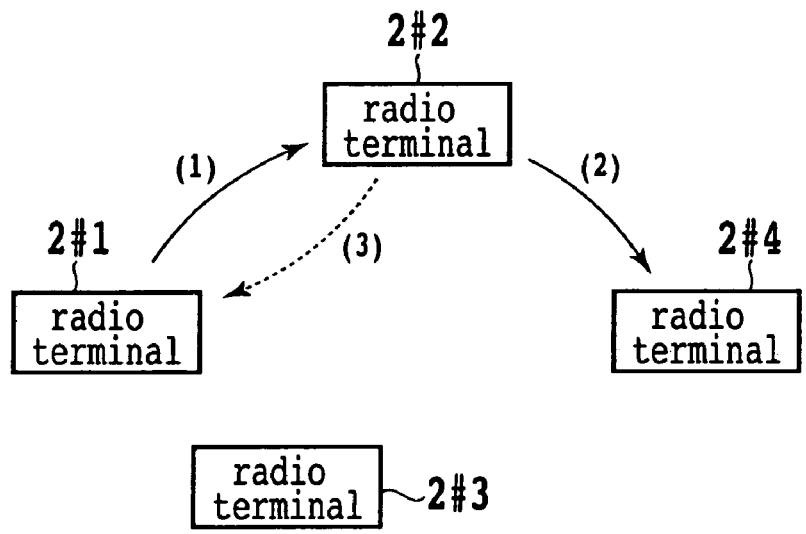
FIG. 1 is a view illustrating a principle of the present invention.
Figure 2:
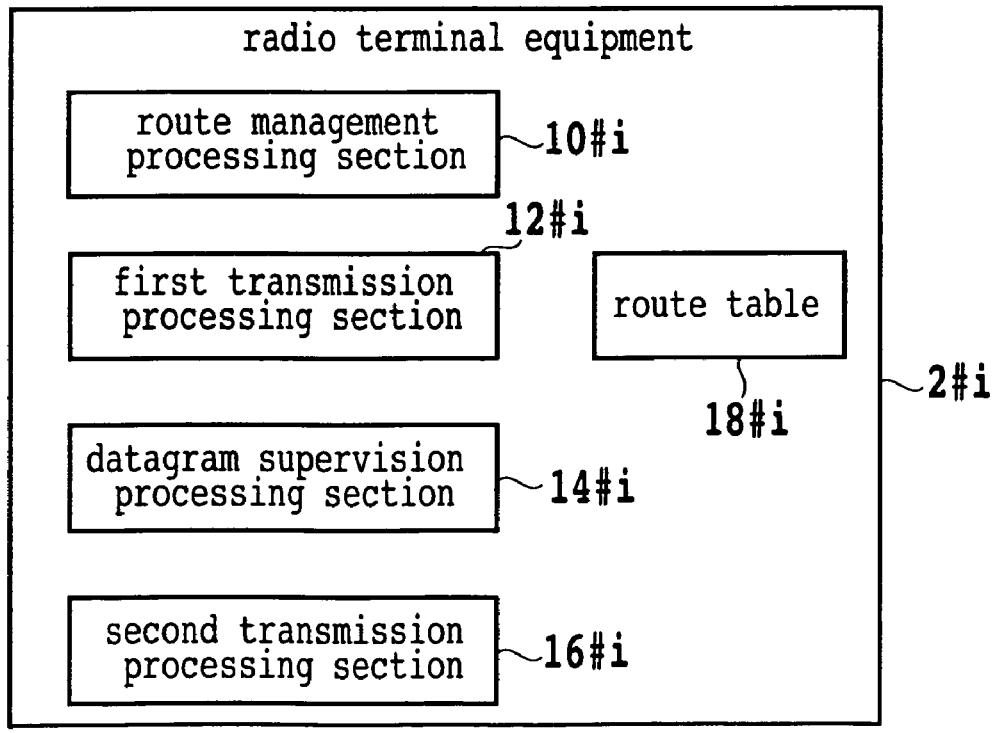
FIG. 2 is a functional block diagram of a terminal of FIG. 1.

FIGS. 1 and 2 are views illustrating a principle of the present invention. As shown in FIG. 1, a plurality of radio terminals 2#i (i=1, 2, . . . ) construct a radio ad hoc network. As shown in FIG. 2, each of the radio terminals 2#i includes a route management processing section 10#i, a first transmission processing section 12#i, a datagram supervision processing section 14#i, and a second transmission processing section 16#i. Here, description is given taking a case wherein the radio terminal 2#1 serves as a transmission source of a datagram, the radio terminal 2#4 is a destination, and the radio terminal 2#2 serves as a relay terminal as an example.

The route management processing section 10#1 registers an address of a radio-relay terminal equipment in a routing table 18#1 for each destination address. The radio-relay terminal relays a datagram destined for the destination address in accordance with a predetermined dynamic routing protocol. Consequently, for a datagram whose destination is the radio terminal 2#4, the radio terminal 2#2 is designated as a relay terminal.

As indicated by (1), the first transmission processing section 12#1 transmits a datagram whose destination is the radio terminal 2#4 to the radio-relay terminal 2#2 in accordance with the routing table 18#1. The second transmission processing section 16#2 in the radio terminal 2#2 receives the datagram, which destination is the radio terminal 2#4 and which should be relayed by the self terminal 2#2. Therefore, the second transmission processing section 16#2 transmits the datagram to the radio terminal 2#4, which corresponds to the destination address of the datagram, as indicated by (2). As indicated by (3), the datagram supervision processing section 14#1 in the radio terminal 2#1 receives datagram transmitted by the radio-relay terminal equipment corresponding to the destination address of the datagram transmitted by the second transmission processing section 16#2. Then, the datagram supervision processing section 14#1 supervises whether or not the datagram has been relayed. Consequently, it can be discriminated whether or not the datagram has been relayed. If the datagram has not been relayed, then it is possible to broadcast the datagram or store the datagram once and then transmit the stored datagram again after the route is updated.

First Embodiment

Figure 3:
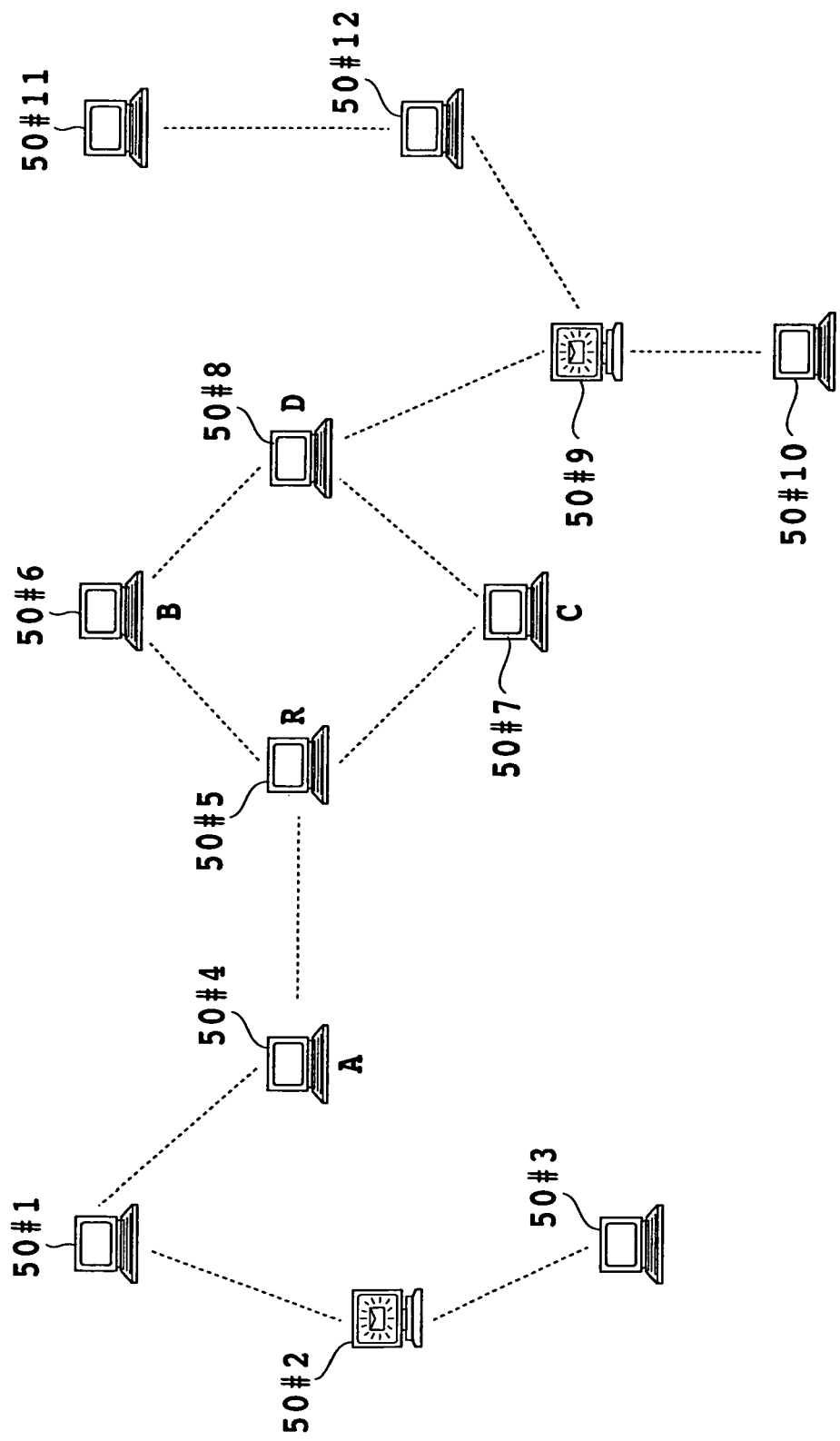
FIG. 3 is a view showing a configuration of a radio ad hoc network according to a first embodiment of the present invention.

FIG. 3 is a view showing a configuration of a radio ad hoc network of an embodiment of the present invention. As shown in FIG. 3, the radio ad hoc network is composed of a plurality of radio terminals (hereinafter referred to simply as terminals) 50#i (i=1, 2, . . . ). While each of the terminals 50#i is a mobile terminal such as a notebook type personal computer or a fixed terminal such as a desk top personal computer, a mobile terminal is used frequently from the convenience in radio communication. Each broken line in FIG. 3 indicates a radio link between adjacent terminals discriminated such that they can communicate with each other by radio in accordance with the dynamic routing protocol.

Figure 4:
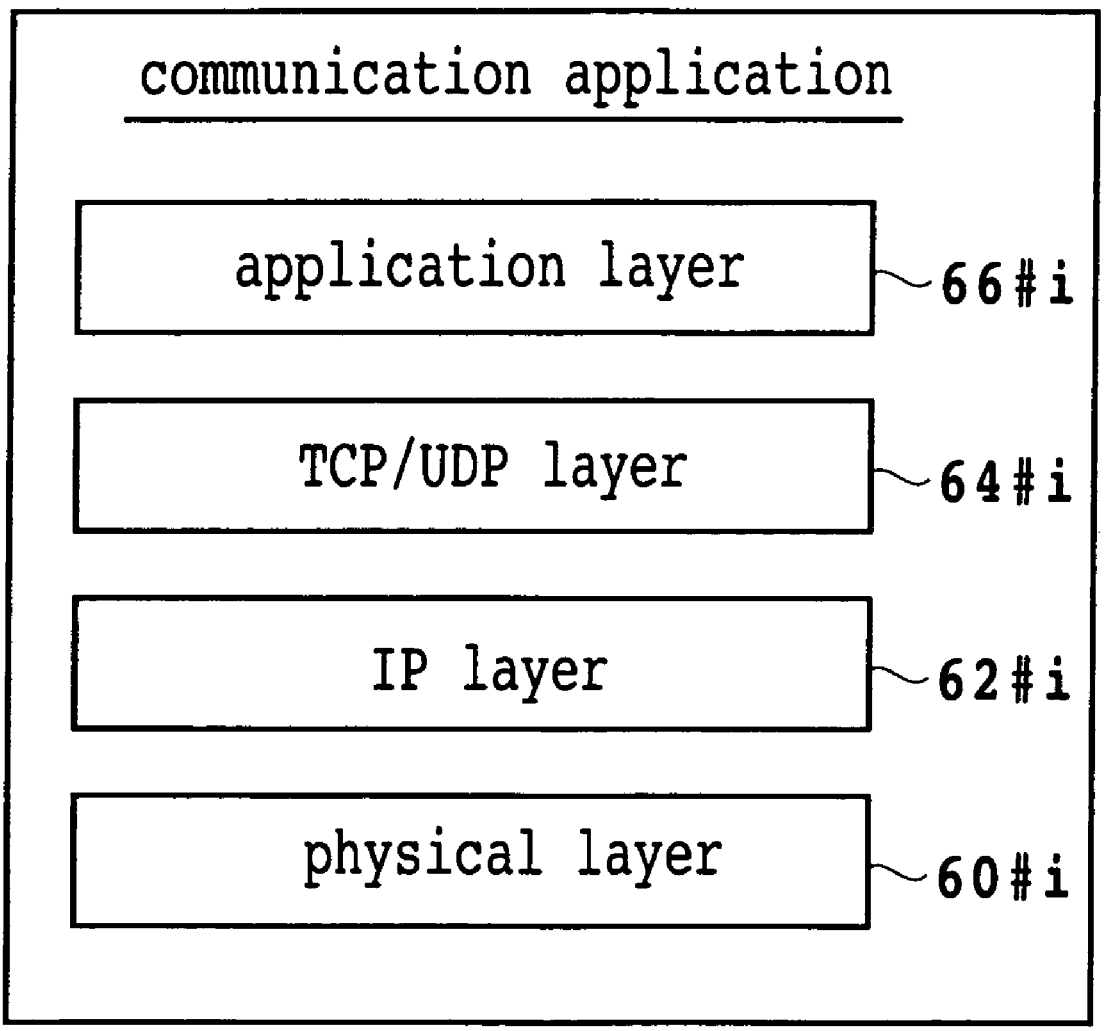
FIG. 4 is a view illustrating a communication application of a terminal in FIG. 3.

FIG. 4 is a view illustrating a layer configuration of a communication application of the terminal 50#i. In the present embodiment, since the TCP/IP is used as the protocol for the radio ad hoc network, the communication application is composed of, from the low layer side, a physical layer 60#i, an IP layer 62#i, a TCP/UDP layer 64#1, and an application layer 66#i as seen in FIG. 4.

Figure 5:
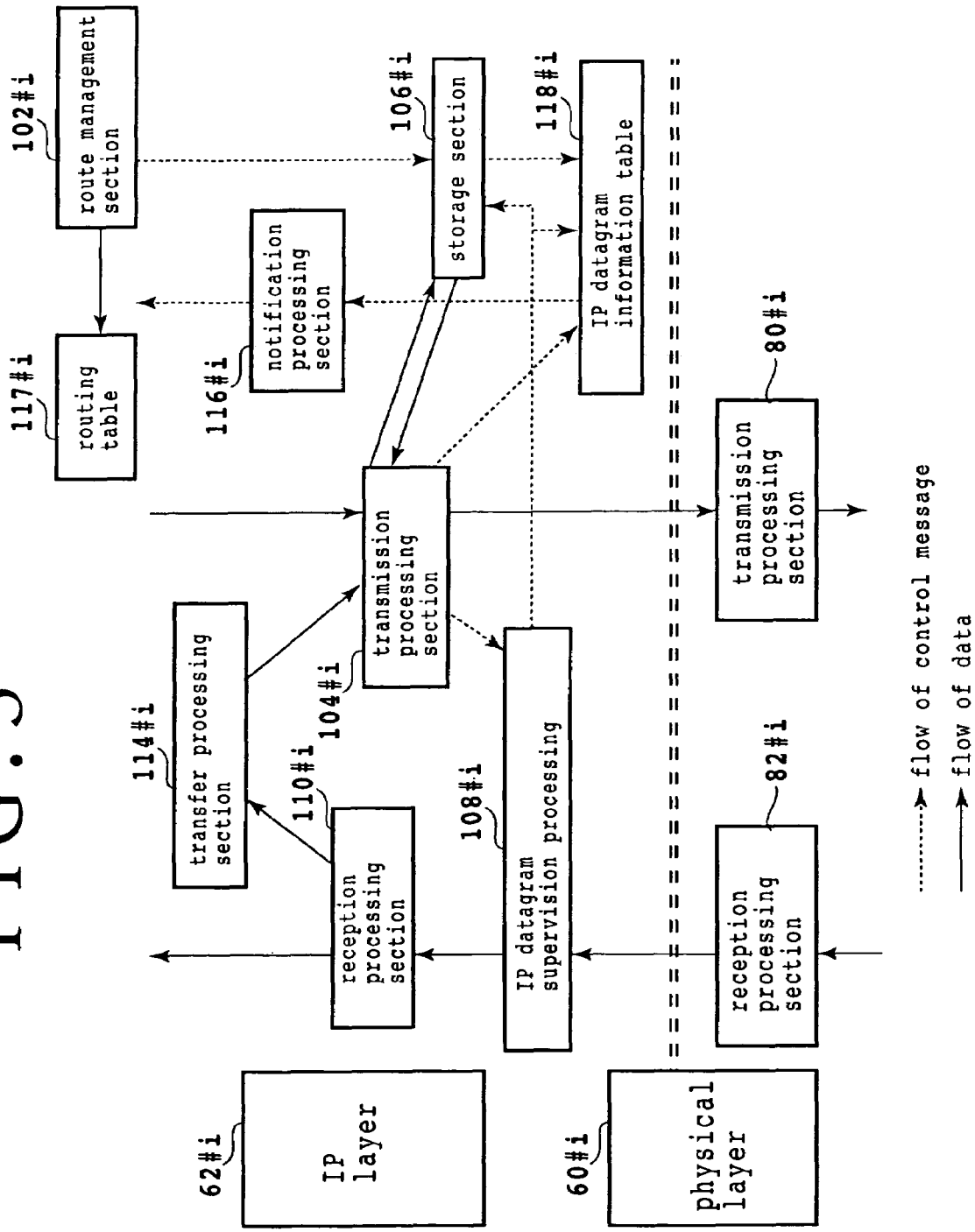
FIG. 5 is a functional block diagram of a physical layer and an IP layer in FIG. 4.

FIG. 5 is a functional block diagram of the physical layer 60#i and the IP layer 62#i in FIG. 4. The physical layer 60#i provides physical communication means (for example, Ethernet, IEEE 802.11b or the like) and has a transmission processing section 80#i and a reception processing section 82#i. The transmission processing section 80#i has the following functions. (1) If an IP datagram is inputted from the IP layer 62#i, then the transmission processing section 80#i assembles the datagram into a physical frame in accordance with a prescribed protocol of the physical layer. (2) The transmission processing section 80#i transmits a physical frame by radio. The reception processing section 82#i receives all of physical frames each including an IP datagram by radio in accordance with the (1) prescribed protocol of the physical layer. The reason why all IP datagrams are received is that it is intended to confirm whether or not an IP datagram has been relayed. (3) The transmission processing section 80#i decomposes a physical frame into an IP datagram, and outputs the datagram to the IP layer 62#i.

The IP layer 62#i provides a routing function for an IP datagram. The IP layer 62#i includes a route management section 102#i, a transmission processing section 104#i, a storage section 106#i, an IP datagram supervision processing section 108#i, a reception processing section 110#i, a transfer processing section 114#i, a notification processing section 116#i, a routing table 117#i, and an IP datagram information table 118#i.

The route management section 102#i has the following functions. (1) The route management section 102#i stores, for each transmission destination IP address, routing information such as an address (next hop address) of a relay terminal, metric, and so forth into the routing table 117#i in accordance with a dynamic routing protocol such as the AODV, OSR, or the like. (2) The route management section 102#i updates the routing information regarding each transmission destination address after every updating interval, which normally is several seconds to several tens seconds. If the relay terminal is lost with the updating interval, then the routing information relating to the terminal is deleted. (3) If a lost route is restored or a new route is determined, then the route management section 102#i issues a notification of this to the storage section 106#i.

The transmission processing section 104#i has the following functions. (1) If a TCP/UDP datagram is inputted from the TCP/UDP layer 64#i, then the transmission processing section 104#i performs the following processes. (i) The transmission processing section 104#i produces an IP header illustrated in FIG. 6. The transmission processing section 104#i adds the IP header to the TCP/UDP datagram to produce an IP datagram and outputs the IP datagram to the transmission processing section 80#i. (ii) The transmission processing section 104#i refers to the routing table 117#i and produces and updates, when the destination is not a relay terminal, IP datagram information in the IP datagram information table 118#i regarding a destination address and an originating source address of the IP datagram. For a new IP datagram that is not registered in the IP datagram information table 118#i as yet, the transmission processing section 104#i produces IP datagram information (destination address, originating source address, Yes for Check, next hop address). If the IP datagram is not a new IP datagram, then Yes is placed in the Check and a counter is incremented. (2) (i) If an IP datagram to be transferred is inputted from the transfer processing section 114#i, then the transmission processing section 104#i outputs the IP datagram to the transmission processing section 80#i. (ii) The transmission processing section 104#i performs a process similar to that of (1)-(ii). (3) When the destination of the IP datagram is not a relay terminal and the IP datagram is a new IP datagram with regard to the destination address and the originating source address, the transmission processing section 104#i issues a notification of new supervision IP datagram information (destination address, originating source address, next hop address) to the IP datagram supervision processing section 108#i. (4) When the destination of the IP datagram is not a relay terminal, the transmission processing section 104#i refers to the IP datagram information table 118#i, and if it is found that the route to the relay terminal is invalid or if the counter exceeds a threshold value, then the transmission processing section 104#i stores the IP datagram into the storage section 106#i. (5) If the IP datagram is sent from the storage section 106#i, then the transmission processing section 104#i outputs the IP datagram to the transmission processing section 80#i.

FIG. 6 is a view illustrating an example of a configuration of the IP header. In the present embodiment, option fields of the IP header are used in the following manner. The fields preceding an option ID are known as those of an IP header, and therefore, description thereof is omitted herein. To the option ID, a pertaining ID is set in order to supervise an IP datagram. In a succeeding 4-byte field of the option fields, an IP address (identification ID) of the self terminal, which has transmitted the IP datagram, is placed. The identification ID is provided to discriminate who has transferred the IP datagram to discriminate whether or not a relay terminal of an object of supervision has transferred the IP datagram. This part is called extended header.

The storage section 106#i has the following functions. (1) The storage section 106#i receives and stores an IP datagram from the transmission processing section 104#i. (2) When a route lost with regard to a destination address is updated from the route management section 102#i, the storage section 106#i outputs IP datagrams in order of storage of the IP datagrams to the transmission processing section 104#i.

The IP datagram supervision processing section 108#i has the following functions. (1) When a notification of new supervision IP datagram information is received from the transmission processing section 104#i, the IP datagram supervision processing section 108#i sets supervision starting flags (sets an Active flag to No, a Check flag to Yes, and a counter to 0) in the datagram information supervision table 118#i. (2) When a supervision datagram is received from the reception processing section 82#i, the IP datagram supervision processing section 108#i sets the supervision confirmation flag of pertaining datagram information to Yes. The supervision datagram is a relayed datagram of an IP datagram transmitted by the terminal itself. Whether or not a datagram is supervision data is discriminated depending upon whether or not the originating source address, the destination address, and the extended header identification ID of the IP datagram are those stored in the supervision datagram information table 118#i.

The reception processing section 110#i has the following functions. (1) If an IP datagram is received from the IP datagram supervision processing section 108#i, then the reception processing section 110#i checks the IP header to determine whether the destination IP address is the address of the terminal itself or the terminal itself is a relay terminal. (2) If the destination IP address is the address of the terminal itself, then the reception processing section 110#i deletes the IP header from the IP datagram and outputs the resulting IP datagram to the TCP/UDP layer 64#i. If the terminal itself is a relay terminal, then the reception processing section 110#i outputs the IP datagram to the transfer processing section 114#i.

When the IP datagram is received from the reception processing section 110#i, the transfer processing section 114#i outputs the IP datagram to the transmission processing section 104#i. The notification processing section 116#i reads out the IP datagram information stored in the IP datagram information table 118#i and notifies the TCP/UDP layer 64 of the IP datagram information. This is because a statistic process is to be performed based on the IP datagram by the TCP/UDP layer 64.

FIG. 7 is a view illustrating a configuration of the IP datagram information table 118#i. As seen in FIG. 7, the IP datagram information table 118#i includes a destination address (Dst.), an originating source address (Src.), a next hop address (NEXT), a route flag (Active), a check flag (Check), a counter (Num), and a utilization interface (IF). The destination address is a destination IP address of the IP datagram. The originating source address is an originating source IP address of the IP datagram. The next hop address is an IP address of a relay terminal of the IP datagram. The route flag is a flag indicative of whether the route is valid or invalid, and represents, when it is Yes, that the route is valid but represents, when it is No, that the route is invalid. The check flag is a flag indicative of an object of supervision regarding whether or not the IP datagram having the destination address and the originating source address has been replayed, and represents, when it is Yes, that the IP datagram is an object of supervision but represents, when it is No, that the datagram is not an object of supervision. The counter is a counter indicating the number of IP datagrams transmitted before confirmation of a transfer state. The utilization interface indicates a utilization interface of the Ethernet (eth0) or the like. This is used to make it possible to change the control in accordance with a utilization interface.

The TCP/UDP layer 64#1 provides a function of managing a session between end terminals. The TCP protocol is a protocol by which transmission is performed after reception of a datagram is confirmed from the other part of communication. The UDP protocol is a protocol continuing transmission without performing confirmation of a datagram from the other party of communication regarding transfer of moving pictures or the like for which real time transfer is required. The present embodiment exhibits its effect where the UDP protocol is used. The application layer 66#i provides a service such as transfer of a stream of a Web, moving pictures, or the like to a user.

In the following, operation of the ad hoc network of FIG. 3 is described. Here, description is given taking a case wherein a datagram is transferred from the terminal 50#4 to the terminal 50#6 as an example. In the ad hoc network of the present embodiment, where an IP datagram is to be transferred from the terminal 50#4 to the terminal 50#6 via the terminal 50#5, after the terminal 50#4 transfers the IP datagram to the terminal 50#5, the terminal 50#4 performs confirmation that the terminal 50#5 has transferred the IP datagram to the terminal 50#6. Terminals A, R, and C represent the terminals 50#4, 50#5, and 50#6, respectively. In the following, description is given of them.

Figure 9:
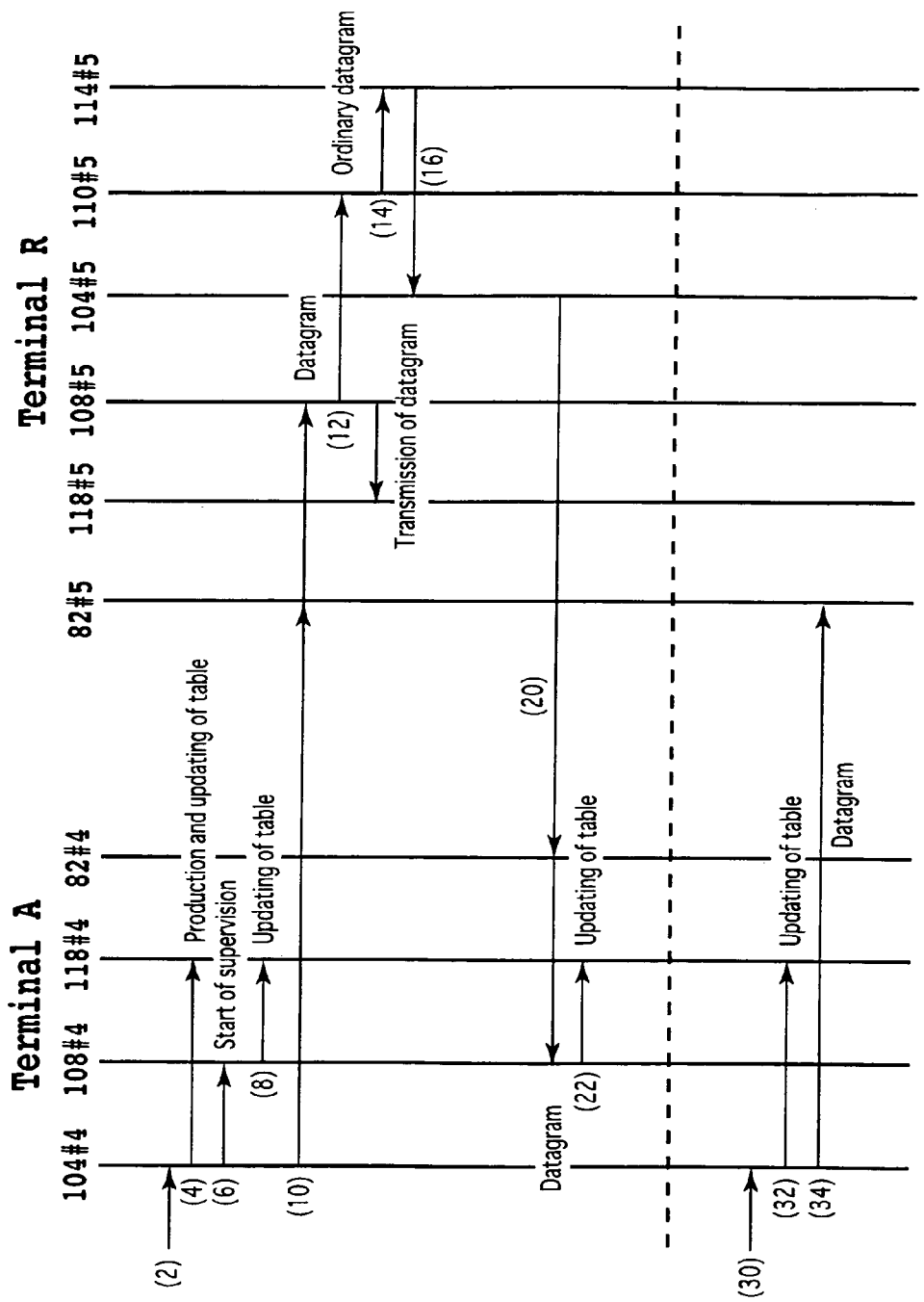
FIG. 9 is a sequence chart illustrating transfer supervision.

FIG. 8 is a view illustrating confirmation of transfer of an IP datagram, and FIG. 9 is a sequence chart of the transfer confirmation of the IP datagram. FIGS. 10A to 10D are views illustrating contents of the IP datagram information table 118#4 in the terminal 50#4 where the originating source address is that of the terminal A and the destination address is that of the terminal C.

(1) Transfer of an IP Datagram from the Terminal A to the Terminal R

Figures 10A, 10B, 10C, 10D, 11:
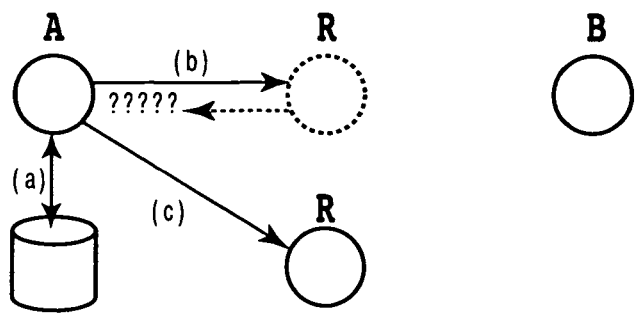
FIG. 10A is a view illustrating an example of a IP datagram information table.
FIG. 10B is a view illustrating another example of the IP datagram information table.
FIG. 10C is a view illustrating a further example of the IP datagram information table.
FIG. 10D is a view illustrating a still further example of the IP datagram information table.
FIG. 11 is a view illustrating storage of an IP datagram in a communication disabled state.

At (2), a datagram destined for the terminal C is inputted to the transmission processing section 104#4. At (4), the transmission processing section 104#4 sets, regarding a route whose originating source address is the terminal A and whose destination address is the terminal C in the IP datagram information table 118#4, the IP datagram information table 118#4 such that the destination address is the terminal C, the originating source address is the terminal A, the next hop address is the terminal R, the check flag is Yes, and the counter is 0 as seen in FIG. 10A.

At (6), the transmission processing section 104#4 notifies the IP datagram supervision processing section 108#4 of the new supervision IP datagram information (destination address, originating source address, and next hop address). At (8), the IP datagram supervision processing section 108#4 sets the route information of the IP datagram information corresponding to the destination address, originating source address, and next hop address in the IP datagram information table 118#4 to No and starts supervision of transfer of the IP datagram. At (10), the transmission processing section 104#4 sets the IP header, option ID, and extended header illustrated in FIG. 6 and transmits the IP datagram accommodated in a frame to the terminal R as seen at (16) in FIG. 9 through the transmission processing section 80#4.

(2) Transfer of an IP Datagram from the Terminal R to the Terminal C

At (10), the reception processing section 82#5 receives the frame transmitted from the terminal A and outputs the IP datagram to the IP datagram supervision processing section 108#5. At (12), the IP datagram supervision processing section 108#5 performs the following processes. (i) The IP datagram supervision processing section 108#5 discriminates whether or not the IP datagram information table 118#5 includes a route whose originating source address, destination address, and next hop address coincide with the originating source address, destination address, and identification ID of the IP datagram and whose check flag is Yes. If the IP datagram information table 118#5 does not include such a route as just described, then the IP datagram supervision processing section 108#5 outputs the IP datagram to the reception processing section 110#5. If such a route as described above exists, then a process hereinafter described is performed. Here, since the IP datagram is destined for the terminal C, a route satisfying the conditions described above is not registered in the IP datagram information table 118#5, the IP datagram supervision processing section 108#5 outputs the IP datagram to the reception processing section 110#5.

At (14), since the destination address of the IP datagram is not the address of the terminal itself, the reception processing section 110#5 outputs the IP datagram to the transfer processing section 114#5. At (16), the transfer processing section 114#5 outputs the IP datagram to the transmission processing section 104#5. It is to be noted here that, since the next hop address of the IP datagram is the destination address, supervision of the IP datagram is not performed. However, if the next hop address is not the destination address, then processes similar to those at (6) to (8) are performed. At (20), the transmission processing section 104#5 transmits the IP datagram to the terminal C through the transmission processing section 80#5 as seen from (b) in FIG. 8. The terminal A also receives the IP datagram as seen from (c) in FIG. 8.

(3) Transfer Supervision by the Terminal a (where Transfer is Performed Normally)

At (20), the reception processing section 82#4 receives the frame transmitted from the terminal R and outputs the IP datagram to the IP datagram supervision processing section 108#4. At (22), the IP datagram supervision processing section 108#4 discriminates, similarly as at (12), whether or not the IP datagram information table 118#4 includes a route whose originating source address, destination address, and next hop address coincide with the originating source address, destination address and identification ID of the IP datagram and whose check flag is Yes. Here, since such a route as described above exists, the following process is executed. The IP datagram supervision processing section 108#4 sets the route flag with regard to which the originating source address is the terminal A, the destination address is the terminal C, and the next hop address is the terminal R to Yes. In addition, the check flag is set to No, and the counter is set to 0 in the IP datagram information table 118#4 as seen in FIG. 10C. Thereafter, the processes are repeated as indicated by (30) to (34).

(4) Transfer Supervision by the Terminal A (where Transfer is not Performed Normally)

Figure 12:
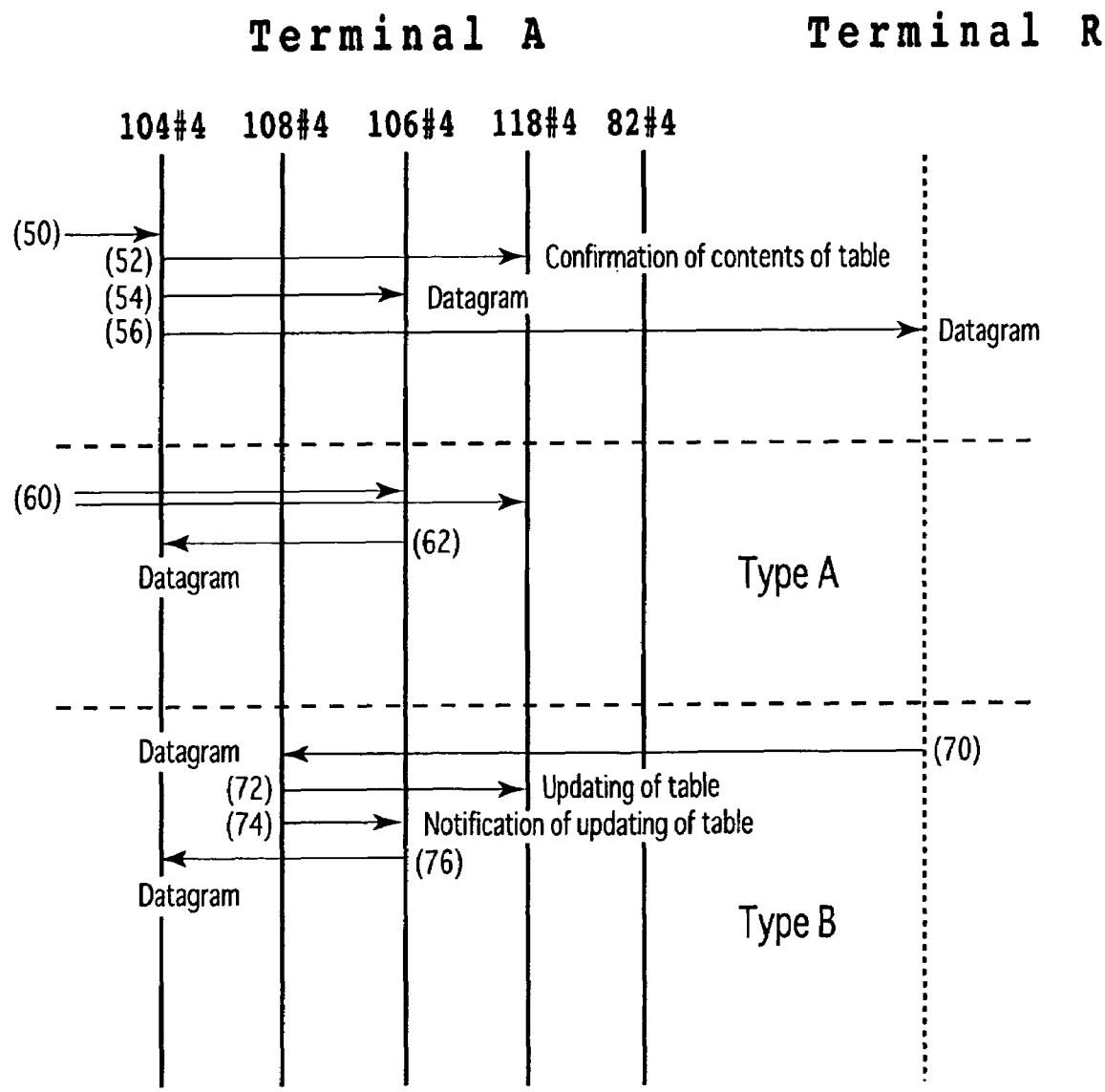
FIG. 12 is a sequence chart illustrating storage of an IP datagram in a communication disabled state.

FIG. 11 is a view illustrating processes where transfer is not performed normally, and FIG. 12 is a sequence chart where transfer is not performed normally. At (50), an IP datagram destined for the terminal C is inputted to the transmission processing section 104#4. At (52), since IP datagram information is stored already in the IP datagram supervision processing section 108#4, the transmission processing section 104#4 increments the counter for IP datagrams in the IP datagram information table 118#4 as seen in FIG. 10D. At (54), the transmission processing section 104#4 stores the IP datagram into the storage section 106#4 if the route flag of the IP datagram information is No or the counter exceeds a threshold value. Here, since a state wherein communication is impossible occurs with the terminal R by some reason (by shadowing or a movement of the terminal R) and the route flag is No or the counter exceeds the threshold value, the transmission processing section 104#4 stores the IP datagram as indicated by (a) in FIG. 11. At (56), the transmission processing section 104#4 sets the address of the terminal A to the option ID and the identification ID of the IP header and transmits the IP datagram accommodated in a frame to the terminal R through the transmission processing section 80#4 as seen from (b) in FIG. 11.

It is assumed that the routing table 117#4 is updated with regard to the routing information relating to the terminal A→terminal C (type A). At (60), after the routing table 117#4 is updated, the route management section 102#4 notifies the storage section 106#4 and the IP datagram information table 118#4 of the updating. When the updating notification is received from the route management section 102#4, the IP datagram information table 118#4 deletes the IP datagram information relating to the updating. At (62), the storage section 106#4 reads out the IP datagrams relating to the updating in order of the storage and outputs the IP datagrams to the transmission processing section 104#4. The transmission processing section 104#4 and the IP datagram supervision processing section 108#4 update the IP datagram information table 118#4 with regard to the route relating to the updating similarly as at (4) to (8) in FIG. 9. The transmission processing section 104#4 transmits the IP datagrams through the transmission processing section 80#4 to the updated next terminal, for example, the terminal R as seen from (c) in FIG. 11.

It is assumed that the terminal R has received an IP datagram from the terminal A and transferred the IP datagram to the terminal C in a similar manner as at (10) to (20) in FIG. 9. At (70), the IP datagram supervision processing section 108#4 receives IP datagram. At (72), the IP datagram supervision processing section 108#4 discriminates whether or not the IP datagram information table 118#4 includes a route whose originating source address, destination address, and next hop address coincide with the originating source address, destination address, and identification ID of the IP datagram and whose check flag is Yes, similarly as at (22). Since such a route as described above exists, the following process is performed. The IP datagram supervision processing section 108#4 sets the route flag with regard to which the originating source address is the terminal A, the destination address is the terminal C, and the next hop address is the terminal R to Yes, the check flag to No, and the counter to 0 in the IP datagram information table 118#4 as seen in FIG. 10C.

At (74), the IP datagram supervision processing section 108#4 notifies the storage section 106#4 of the updating of the IP datagram information table 118#4. At (76), the storage section 106#4 sends the IP datagrams stored therein to the transmission processing section 104#4. When the stored IP datagrams are received, the transmission processing section 104#4 sets the address of the terminal A to the option ID and the identification ID of the IP header and transmits the IP datagram accommodated in a frame to the terminal R through the transmission processing section 80#4.

As described above, in the radio ad hoc network, since each terminal has a function of receiving and analyzing all IP datagrams by receiving an IP datagram originated from an adjacent terminal toward the self terminal, the presence of the adjacent terminal can be confirmed without generating surplus communication. Further, since a transfer situation is confirmed by supervising an IP datagram transmitted from a NEXT terminal, the control method for a transmission queue does not change. This is a significant point with multimedia communication. For example, a CBQ system is available to achieve the security of a communication band. Where a communication band is to be secured, a plurality of transmission queues are prepared in a terminal and different priority degrees are applied to the transmission queues. In a network having such a function as just described, since there is no necessity to change the transmission function, no influence is had on the existing technique.

Further, in the radio ad hoc network, such a case may possibly occur that a terminal forming a communication route disappears temporarily. Where the function of temporarily storing an IP datagram to be transmitted is provided, even if a communication disabled state is entered temporarily, communication can be resumed without any loss of the data immediately after a communication enabled state is restored. In a network environment involving many mobile terminals, a situation wherein route information varies every moment is estimated. For updating of routing information in a radio ad hock network environment, time is required until a new route is searched out. Where multimedia communication is considered, all IP datagrams before the new route information is updated come to be abandoned, which results in deterioration of the service quality. However, since ID datagrams are stored until the new route information is updated and the stored IP datagrams are sent again after a new route is updated, the deterioration of the service quality can be suppressed to the minimum.

Second Embodiment

Figure 13:
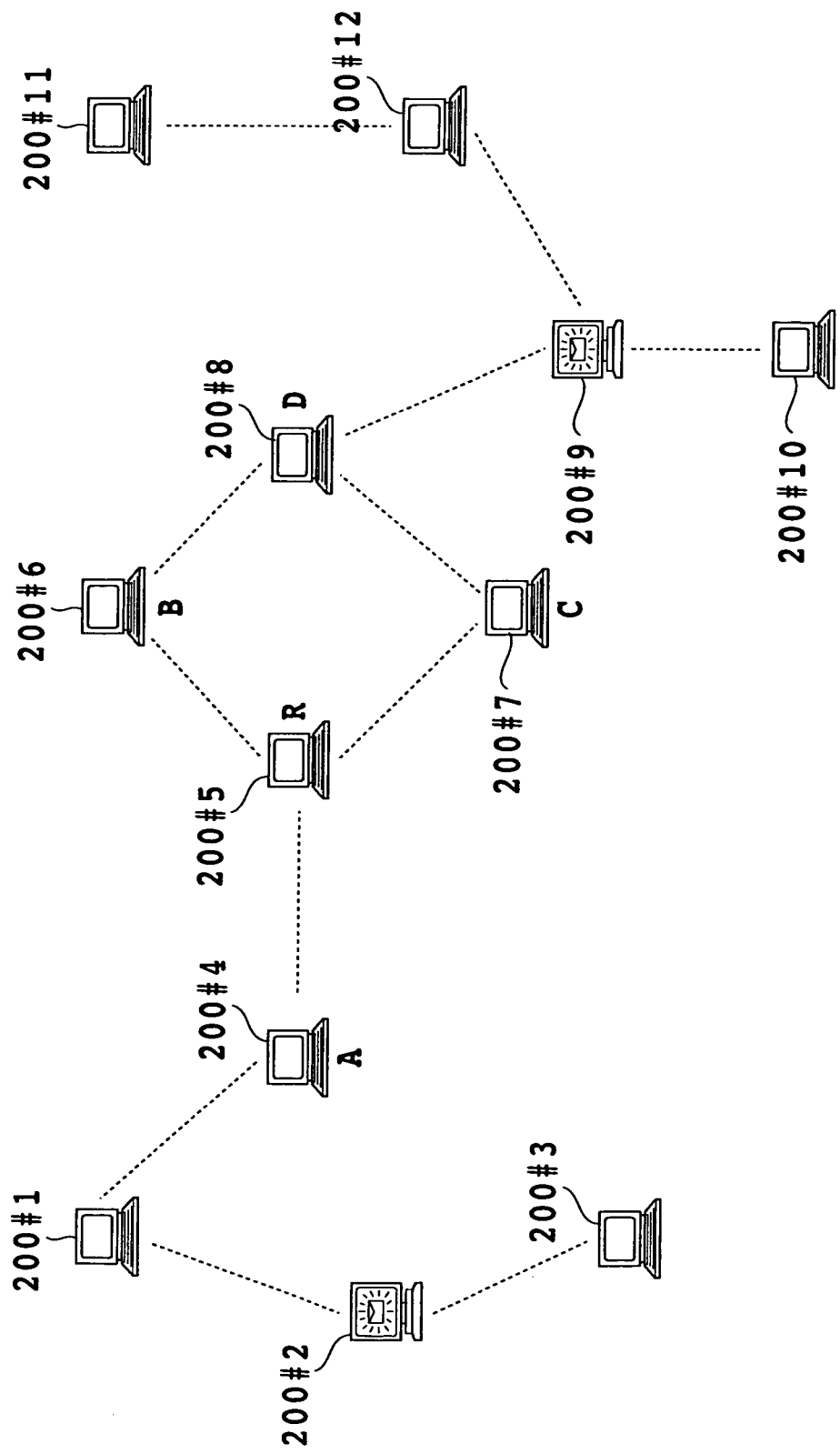
FIG. 13 is a view showing a configuration of a radio ad hoc network according to a second embodiment of the present invention.
Figure 14:
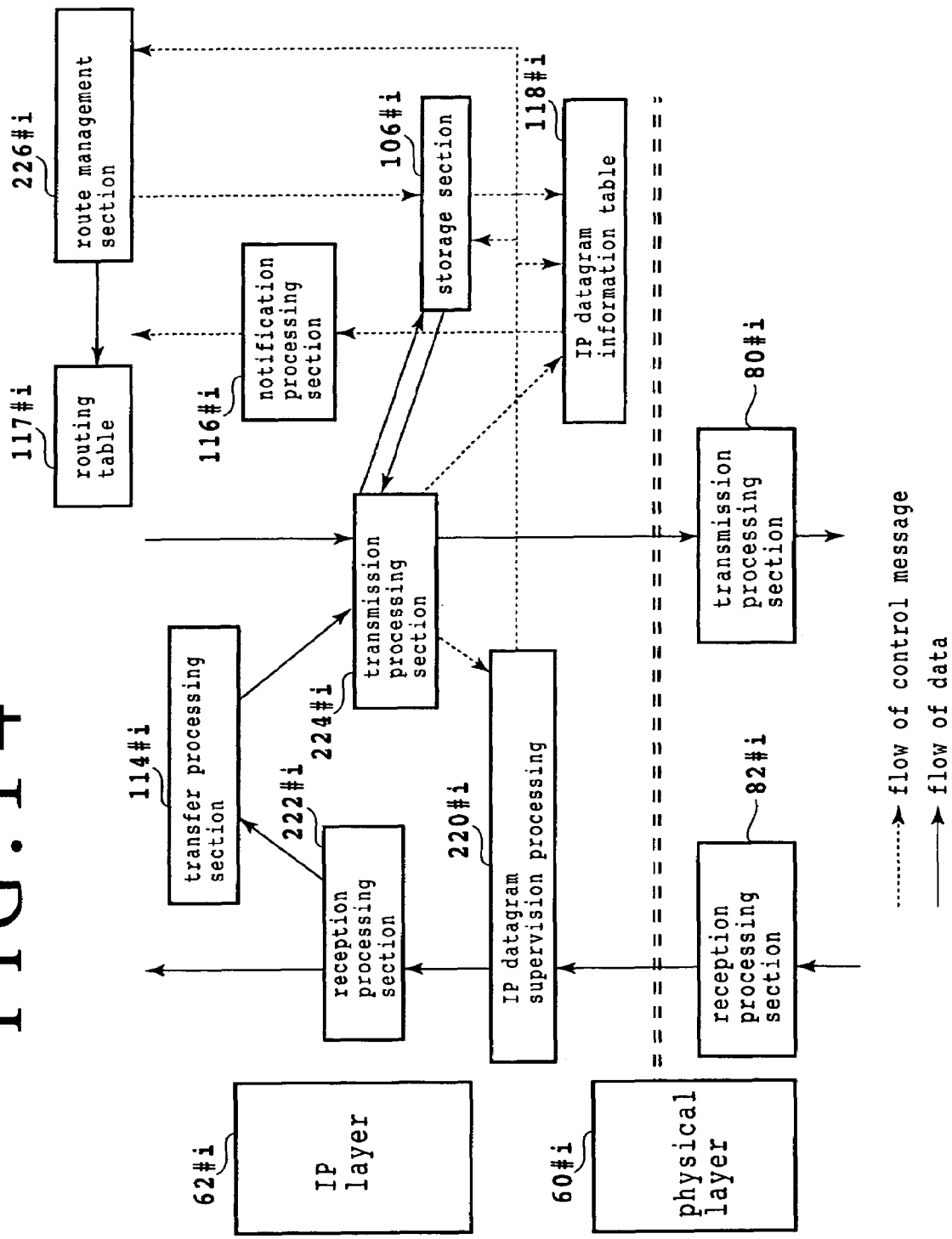
FIG. 14 is a functional block diagram of a physical layer and an IP layer in FIG. 13.

FIG. 13 is a view showing a configuration of an ad hoc network according to a second embodiment of the present invention. FIG. 14 is a functional block diagram of a physical layer and an IP layer in FIG. 13, and same reference characters denote substantially same components as those in FIG. 4. An IP datagram supervision processing section 220#i has the following functions in addition to the functions in FIG. 4. (1) The IP datagram supervision processing section 220#i discriminates whether or not a next terminal is in congestion with regard to a route any other than a route with regard to which the self terminal 200#i is an originating source or a relay terminal. This is a case, for example, the terminal R is a relay terminal with regard to a route from the terminal B to the terminal C and the terminal R is a relay terminal with regard to another route from the terminal A to the terminal C. In that case, the route from the terminal A to the terminal C takes precedence and congestion occurs with the terminal R. This occurs, for example, where a communication band between the terminal A and the terminal C is assured by the RSVP or the like. A criterion of the congestion is based on the ration of IP datagrams. When the ratio of IP datagrams from the terminal A and IP datagrams transmitted from the terminal B itself exceeds a certain threshold value, it is determined that congestion occurs. (2) When congestion occurs with the next terminal, the IP datagram supervision processing section 220#i issues an instruction to a transmission processing section 224#i to perform data transmission by broadcasting. (3) When a relayed IP datagram regarding the broadcast IP datagram is received, the IP datagram supervision processing section 220#i notifies a route management section 226#i of such reception and issues an instruction to the transmission processing section 224#i to stop a broadcasting.

Figures 15, 16:
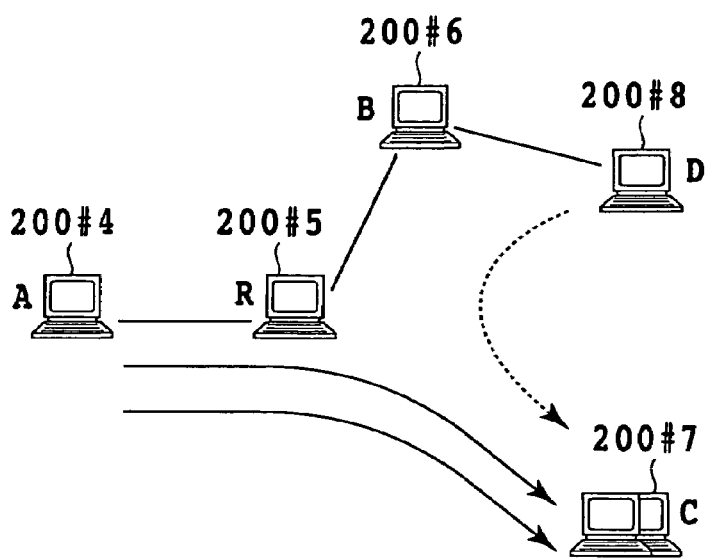
FIG. 15 is a view illustrating a configuration example of an IP header.
FIG. 16 is a view illustrating control upon congestion.

The transmission processing section 224#i has the following functions in addition to the functions of the transmission processing section 104#i in FIG. 4. (1) If an instruction to perform data transmission by broadcasting is received from the IP datagram supervision processing section 220#i, then the transmission processing section 222#i changes the IP header to that for broadcast communication as seen in FIG. 15. (2) If an instruction to stop the broadcasting is received from the IP datagram supervision processing section 220#i, then the transmission processing section 222#i transmits an IP datagram to a next terminal in accordance with the routing table 117#i.

FIG. 15 is a view illustrating a configuration of the IP header. As seen in FIG. 15, when an IP datagram is to be broadcast, the transmission source address is set to all zeros and the destination address is set to a broadcast address, and an option ID, an identification ID (self terminal address), a before-change originating source address, and a before-change destination address are set. In the following description, the identification ID, before-change originating source address, and before-change destination address are collectively referred to as extended header.

The reception processing section 222#i has the following functions in addition to the functions of the reception processing section 110#i in FIG. 4. (1) When the destination address is the broadcast address, the reception processing section 224#i sets the before-change originating source address of the extended header to the originating source address. Also, the before-change destination address is set to the destination address. The section 224#i outputs the frame to the transfer processing section 114#i. (2) When the self terminal is a next terminal of an IP datagram, the transmission processing section 224#i outputs the IP datagram to the transfer processing section 114#i.

FIG. 16 is a view illustrating the operation of FIG. 13. As seen in FIG. 16, a route of the terminal A→terminal R→terminal C is set as a preferential route. The terminal A transmits an IP datagram destined for the terminal C. The terminal R receives the IP datagram destined for the terminal C and transmits the IP datagram to the terminal C. Meanwhile, the terminal B has an IP datagram destined for the terminal C, and it is assumed that a route passing the terminal R is set as a route from the terminal B to the terminal C in the routing table 117#6 of the terminal B. If the terminal B receives an IP datagram whose originating source is the terminal A and whose destination is the terminal C from the terminal R, then the terminal B discriminates the ratio of IP datagrams. The terminal B discriminates whether or not the ratio between IP diagrams from the terminal A and IP datagrams to be transmitted from the terminal B itself exceeds a certain threshold value. If the ratio exceeds the threshold value, then it can be discriminated that there is the possibility that congestion may occur with the terminal R. The datagram destined for the terminal C from the terminal B and passing the terminal R may be abandoned without being relayed.

Therefore, the IP header of the IP datagram destined for the terminal C is changed to that for broadcast communication as seen in FIG. 15.

When the terminal D receives the IP datagram to which the broadcast address is set from the terminal B, it sets the before-change originating source address and the before-change destination address of the extended header of the IP header to the originating source address (terminal B) and the destination address (terminal C) and transmits the frame to the terminal C as seen from FIG. 16. When the terminal B receives the IP datagram destined for the terminal C and relayed by the terminal D, it updates the relay terminal address of the routing table 117#8 to the terminal D with regard to the route whose destination address is the terminal C and notifies the IP datagram information table 118#8. The IP datagram information table 118#8 initializes the IP datagram information with regard to the route whose originating source address is the terminal B and whose destination address is the terminal C. Thereafter, the terminal B transmits the IP datagram destined for the terminal C with the terminal D designated as a relay terminal as seen in FIG. 16. The terminal D transmits the IP datagram destined for the terminal C to the terminal C. The terminal C receives the IP datagram whose originating source address is the terminal. B. It is to be noted that, if the terminal C receives same IP datagrams transmitted from a plurality of terminals having received the IP datagram broadcast from the terminal B, then it abandons them except the first received one.

As described above, in a radio ad hoc network, each terminal has a function of receiving and analyzing all IP datagrams by receiving an IP datagram originated toward the self terminal from an adjacent terminal. Thus, a congestion state of the adjacent terminal can be confirmed without generating surplus communication. Then, if it is discriminated that a congestion state occurs, then broadcasting is performed. Consequently, the possibility that a packet may be delivered to an object terminal is raised and deterioration of the service can be suppressed to the minimum.

Third Embodiment

Figure 17:
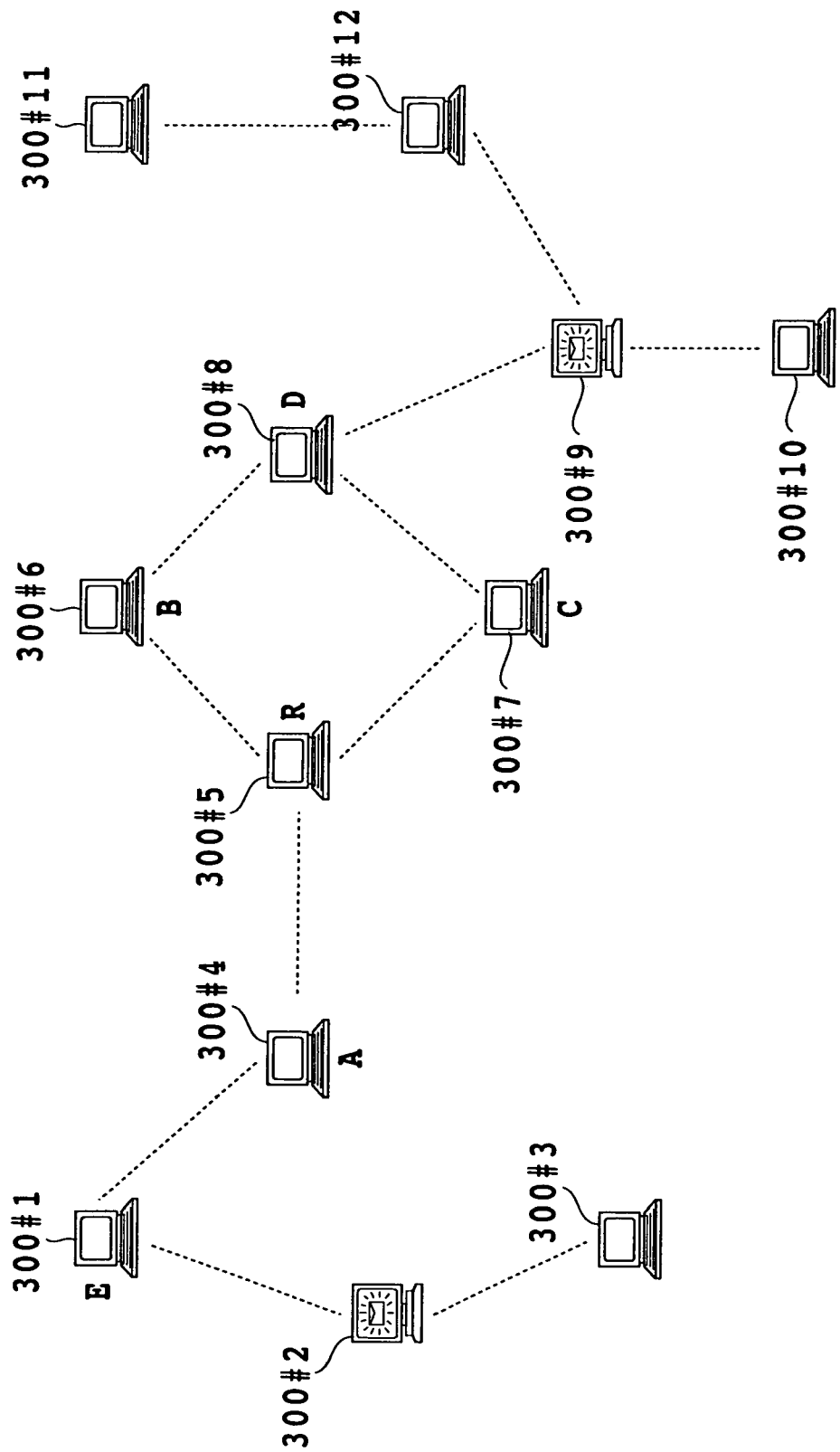
FIG. 17 is a view showing a configuration of a radio ad hoc network according to a third embodiment of the present invention.
Figure 18:
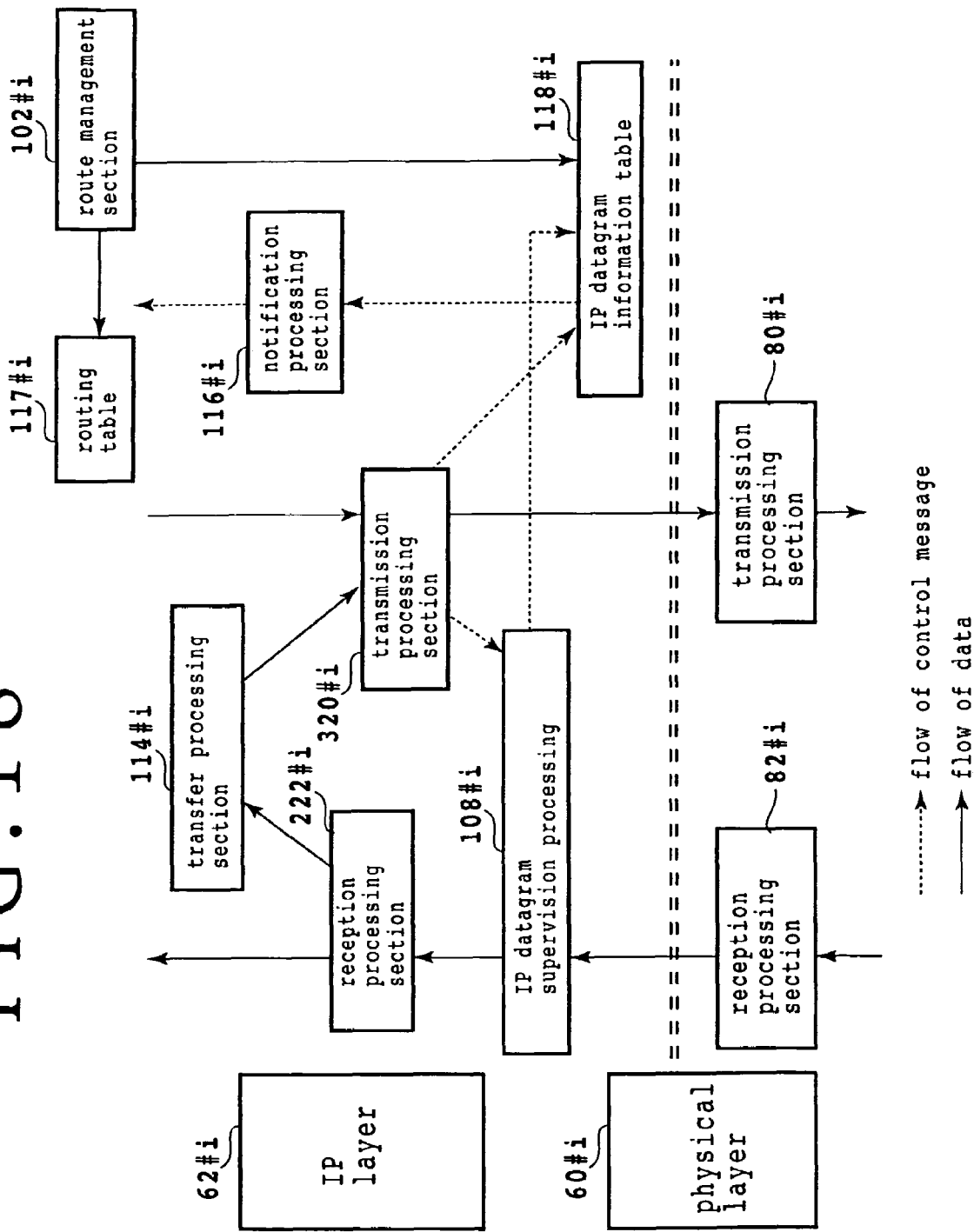
FIG. 18 is a functional block diagram of a physical layer and an IP layer in FIG. 17.

FIG. 17 is a view showing a configuration of an ad hoc network according to a third embodiment of the present invention. FIG. 18 is a functional block diagram of a physical layer and an IP layer in FIG. 17, and same reference characters denote substantially same components as those of FIGS. 4 and 14. A transmission processing section 320#i has the following functions. (1) If an IP datagram is inputted, the transmission processing section 320#i checks IP datagram information in the IP datagram information table 118#i corresponding to an originating source address and a destination address of the IP datagram. Then, the section 320#i discriminates whether or not an IP datagram coinciding with the originating source address and the destination address has been relayed similarly to the transmission processing section 104#i in FIG. 5. (2) If it is discriminated that the IP datagram has been relayed, then the transmission processing section 320#i performs a process similar to that of the transmission processing section 104#i in FIG. 5. (3) If it is discriminated that the IP datagram has not been relayed, then the transmission processing section 320#i updates the IP header of the IP datagram to that for broadcasting communication as seen in FIG. 15.

Also in the present embodiment, description is given taking a case wherein an IP datagram is transmitted along the terminal A→terminal R→terminal C as an example. Before a situation wherein communication between the terminal A and the terminal R is disabled occurs from some reason (shadowing or movement of the terminal R) with the terminal R, a transmission process of an IP datagram from the terminal A to the terminal R and a confirmation process of transfer of the IP datagram from the terminal R to the terminal C are similar those in the first embodiment. Therefore, description is given of a process after a situation wherein communication between the terminal A and the terminal R is disabled occurs.

Figure 19:
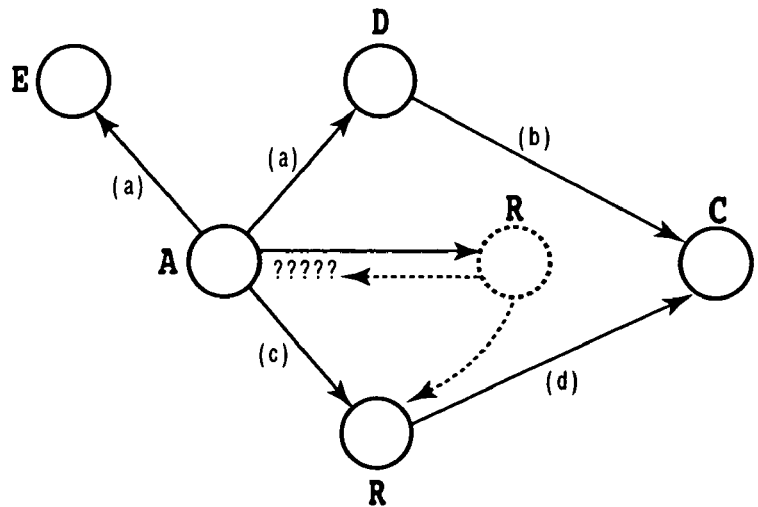
FIG. 19 is a view illustrating broadcasting in a communication disabled state.
Figure 20:
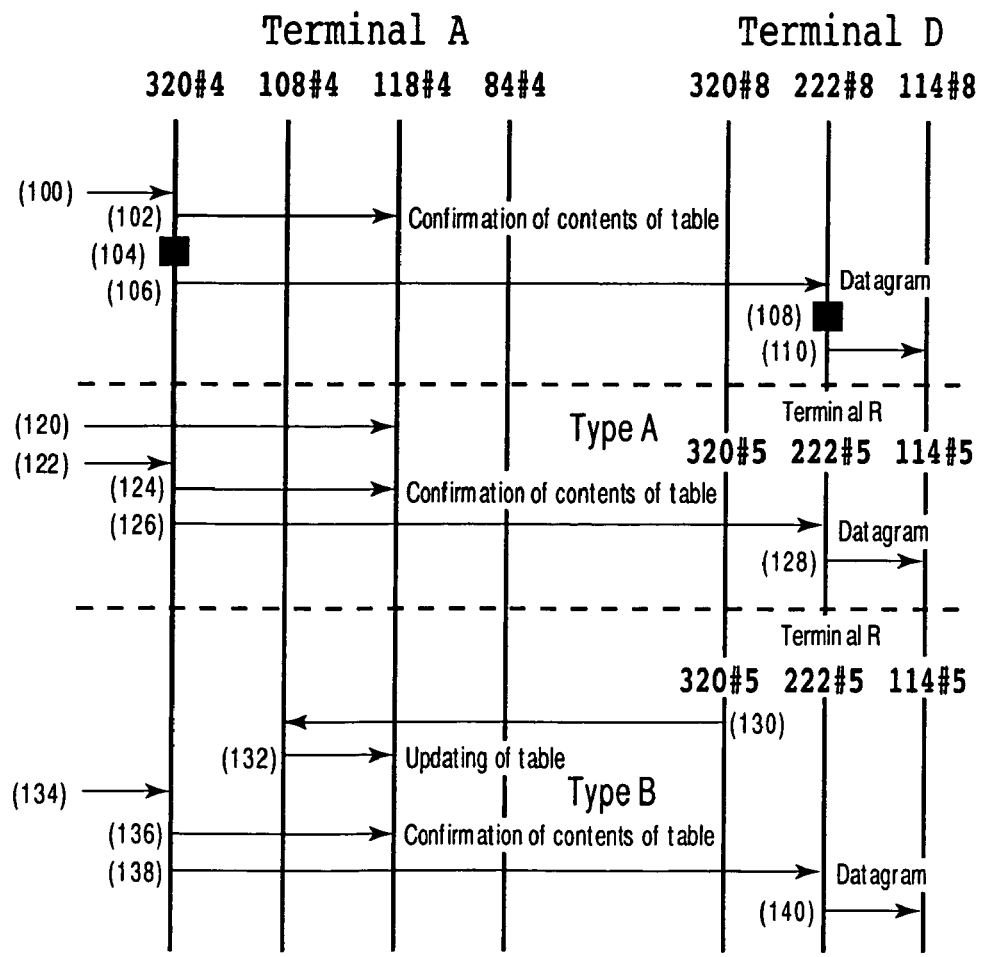
FIG. 20 is a sequence chart in a communication disabled state.

FIG. 19 is a view illustrating a process after a situation wherein communication between the terminal A and the terminal R is disabled occurs, and FIG. 20 is a sequence chart illustrating the process after the situation wherein communication between the terminal A and the terminal R is disabled occurs.

(1) Broadcasting Transmission

At (100) in FIG. 20, an IP datagram destined for the terminal C is inputted to the transmission processing section 320#4. At (102), the transmission processing section 320#4 sets the check flag for IP datagram information in the IP datagram information table 118#4 to Yes and increments the counter by one with regard to a route whose transmission source is the terminal A and whose destination is the terminal C as seen in FIG. 10D. The transmission processing section 320#4 refers to the IP datagram information table 118#4 to confirm whether or not the IP datagram has been transferred by a relay terminal. Here, it is assumed that the terminal A and the terminal R are in a state wherein communication therebetween is disabled and the counter exceeds a threshold value. At (104), the transmission processing section 320#4 updates the IP header to an IP header for broadcasting as seen in FIG. 15. At (106), the transmission processing section 320#4 broadcasts the IP datagram accommodated in the frame to the terminal R through the transmission processing section 80#4 as indicated by (a) in FIG. 19.

(2) Broadcasting Reception

It is assumed that the terminal D existing around the terminal A receives an IP datagram. At (106), if the reception processing section 82#8 of the terminal B receives the frame, then it outputs the IP datagram to the IP datagram supervision processing section 108#8. If the IP datagram supervision processing section 108#8 refers to the IP datagram information table 118#8, it is discriminated that the IP datagram is not an object of supervision. Then, the IP datagram supervision processing section 108#8 outputs the IP datagram to the reception processing section 222#8. The reception processing section 222#8 sets the before-change destination address and the after-change transmission source address set in the option header to the destination address and the transmission source address of the IP header to construct an IP datagram header. At (108), the reception processing section 222#8 outputs the IP datagram to the data transfer processing section 114#8. The data transfer processing section 114#8 outputs the IP datagram to the transmission processing section 320#8. The transmission processing section 320#8 transmits the IP datagram accommodated in the frame to the terminal C as indicated by (b) in FIG. 19 through the transmission processing section 80#8 similarly as at (12) to (20) in FIG. 9. Processes similar to those at (100) to (110) are performed until after the routing table 117#4 of the route of the terminal A→terminal C is updated.

(3) Where the Routing Table 117#4 is Updated (Type A)

It is assumed that the routing table 117#4 for the route of the terminal A→terminal C is updated. This is a case, for example, when the terminal R returns to its original position or the terminal D becomes a relay terminal. It is assumed here that the routing table 117#4 is updated because the terminal R returns to its original position. At (120), the route management section 102#4 updates the routing table 117#4 for the route of the terminal A→terminal C and notifies the IP datagram information table 118#4. The IP datagram information table 118#4 initializes IP datagram information regarding the terminal A→terminal C. At (122), the IP datagram is inputted to the transmission processing section 320#4 of the terminal A.

At (124), the transmission processing section 322#4 notifies the IP datagram supervision processing section 108#4 of the new supervision IP datagram information. The IP datagram supervision processing section 108#4 sets the route flag of IP datagram information corresponding to the destination address, originating source address, and next hop address in the IP datagram information table 118#4 to No and starts supervision of transfer of the IP datagram. At (126), the transmission processing section 320#4 transmits the IP datagram accommodated in the frame to the terminal R as indicated by (c) in FIG. 19 through the transmission processing section 80#4.

When the reception processing section 222#5 receives the IP datagram, it outputs the IP datagram to the transfer processing section 114#5 at (128). At (130), the transmission processing section 320#5 sets the address of the terminal A to the option ID and the identification ID of the IP header and transmits the IP datagram accommodated in the frame to the terminal C through the transmission processing section 80#5 as indicated by (d) in FIG. 19.

Processes after the routing table 117#4 is updated and the first IP datagram is transmitted are referred to as type 2. At (130), the reception processing section 82#4 receives the frame transmitted from the terminal R and outputs the IP datagram to the IP datagram supervision processing section 108#4. At (132), the IP datagram supervision processing section 108#4 performs a process similar to that at (22) to update the IP datagram information table 118#4. At (134) to (140), the IP datagram is transmitted from the terminal A to the terminal R similarly as at (122) to (128).

In a radio ad hoc network, a terminal on a route is likely to disappear suddenly (the terminal is disabled from performing a relay function, for example, by disconnection of power supply to the terminal or by movement of the terminal). Even in such an instance, communication can be performed from another adjacent terminal immediately, and consequently, communication can be performed without transmission of data. In the radio ad hoc network, a communication route changes every moment. In this instance, a method may be used wherein a plurality of paths are prepared in advance such that, when a main route is disconnected, another route is selected and used for communication. In such an instance, if a plurality of paths are placed simultaneously into a state wherein they are disabled from use, then a situation wherein communication is impossible is entered although communication is actually possible through a different route. In the present embodiment, if a route is disconnected, then since an IP datagram is broadcast, an adjacent terminal receiving the IP datagram, which has a route to a destination terminal, relays the IP datagram. Consequently, the loss of data can be minimized.

According to the invention described above, since each terminal receives an IP datagram transmitted from an adjacent terminal to supervise whether or not the adjacent terminal has transferred the IP datagram. If communication between the terminal and the adjacent terminal is disabled, then the terminal stores the IP datagram and then transmits, after communication is resumed, the stored IP datagram. Thus, the loss of data can be minimized.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A radio terminal equipment, comprising:
a route supervision processing section for registering, for each destination address, an address of a radio-relay terminal equipment, which relays datagrams destined for the destination address, into a routing table in accordance with a predetermined dynamic routing protocol;
a first transmission processing section for transmitting a datagram to a radio-relay terminal equipment corresponding to the destination address of the datagram in accordance with said routing table;
a datagram supervision processing section for receiving a first datagram transmitted by another radio terminal equipment and checking whether a source address of the first datagram is an address of the radio terminal equipment, and judging whether a second data transmitted by the radio terminal equipment having a destination address that is the same as the destination address of the first datagram has been relayed by the other radio terminal equipment when the source address of the first data rain is the address of the radio terminal equipment; and
a second transmission processing section for transmitting, where a received third datagram is to be relayed by said radio terminal equipment itself, the third datagram to the radio terminal equipment corresponding to the destination address of the third datagram in accordance with said routing table.

2. The radio terminal equipment according to claim 1, wherein, when it is discriminated that the datagram has not been relayed, said first transmission processing section stores a datagram whose destination address is same as that of the datagram into a storage section and refers to said routing table such that, when the address of the radio-relay terminal equipment with regard to the destination address of the datagram is updated, datagrams stored in said storage section are transmitted in order of storage times.

3. The radio terminal equipment according to claim 1, wherein said datagram supervision processing section receives a datagram transmitted from the radio-relay terminal equipment to discriminate whether or not the radio-relay terminal equipment is in a congested state with a datagram other than the relayed datagram of the datagram transmitted from said radio terminal equipment itself.

4. The radio terminal equipment according to claim 1, wherein, when it is discriminated that the datagram has not been relayed, said first transmission processing section stores a destination address set in a predetermined area of a header of a datagram whose destination address is same as that of the datagram into another area and updates the destination address in the predetermined area to a broadcast address and then transmits the datagram.

5. The radio terminal equipment according to claim 3, wherein, when it is discriminated that the radio-relay terminal equipment corresponding to the destination address of the datagram is in a congestion state, said first transmission processing section stores a destination address set in a predetermined area of a header of the datagram into another area and updates the destination address in the predetermined area to a broadcast address and then transmits the datagram.

6. The radio terminal equipment according to claim 4, wherein, where the broadcast address is set in the header of the datagram and the destination address is accommodated in the different area, said second transmission processing section sets the destination address to the predetermined area and transmit the datagram.

7. The radio terminal equipment according to claim 1, wherein said radio terminal equipment comprises a datagram supervision table for storing supervision information including a transmission source address, a destination address, and a counter, and said first transmission section increments, when a datagram is to be transmitted, the counter corresponding to a transmission source address and a destination address of the datagram and discriminates, if the counter exceeds a threshold value, that a datagram whose transmission source address and destination address are same as those of the datagram has not been relayed, and said datagram supervision section resets the counter of the supervision information corresponding to the destination address and the transmission source address of the received datagram.

8. The radio terminal equipment according to claim 6, wherein, when a relayed datagram of the datagram to which the broadcast address is set is received, said route management section updates the address of the radio-relay terminal equipment corresponding to the transmission source address and the destination address of the relayed datagram.

9. A radio terminal equipment according to claim 1, wherein the datagram contains an extended header to be set with an address of the radio terminal equipment transmitting the datagram, and the radio terminal equipment sets the address of the radio terminal equipment to the extended header of the datagram, and transmits the datagram, said datagram supervision processing section judging that the second datagram was relayed by a radio terminal equipment having an address the same as the address set in the extended header of the first datagram.

* * * * *